(12) United States Patent
Zynda

(10) Patent No.: US 6,834,987 B2
(45) Date of Patent: Dec. 28, 2004

(54) ILLUMINATED MEDALLION FOR TRANSMISSION SHIFTER KNOBS

(76) Inventor: Dennis R. Zynda, 10 S. 049 Alan Rd., Naperville, IL (US) 60564

( * ) Notice: Subject to any disclaimer, the term of this patent is extended or adjusted under 35 U.S.C. 154(b) by 0 days.

(21) Appl. No.: 10/295,094

(22) Filed: Nov. 15, 2002

(65) Prior Publication Data

US 2004/0095778 A1 May 20, 2004

(51) Int. Cl.[7] .................................................. B60L 3/00
(52) U.S. Cl. ....................... 362/487; 362/491; 116/28.1
(58) Field of Search ................................ 362/491, 487; 116/28.1

(56) References Cited

U.S. PATENT DOCUMENTS

| | | | |
|---|---|---|---|
| 1,541,209 A | | 6/1925 | Cotton |
| 1,548,197 A | | 8/1925 | Kendal |
| 1,575,625 A | * | 3/1926 | Dibelka ..................... 362/491 |
| 2,096,190 A | * | 10/1937 | Moeller ..................... 362/491 |
| 2,295,468 A | | 9/1942 | Haley |
| 2,469,274 A | * | 5/1949 | Rein ......................... 200/314 |
| 3,231,857 A | | 1/1966 | Miller |
| 3,742,204 A | | 6/1973 | Price |
| 5,070,431 A | | 12/1991 | Kitazawa et al. |
| D328,413 S | | 8/1992 | Alexander |
| 5,239,450 A | | 8/1993 | Wall |
| 5,335,148 A | | 8/1994 | Tominaga |
| 5,412,547 A | | 5/1995 | Hornblad |
| 5,536,543 A | | 7/1996 | Papandreou |
| 5,542,201 A | | 8/1996 | Grondal |
| 5,546,687 A | | 8/1996 | Iorfida |
| 5,602,525 A | * | 2/1997 | Hsu ............................ 340/456 |
| 5,607,222 A | | 3/1997 | Woog |
| 5,636,914 A | | 6/1997 | Trusiani |
| 5,755,506 A | | 5/1998 | Ray |
| 5,900,676 A | * | 5/1999 | Kweon et al. ............. 307/10.1 |
| 5,984,485 A | | 11/1999 | Poli |
| 5,993,019 A | | 11/1999 | Kline et al. |
| 6,003,203 A | | 12/1999 | Fowlston |
| 6,019,478 A | | 2/2000 | Pizzo |
| 6,073,374 A | | 6/2000 | Tingmo |
| 6,076,294 A | | 6/2000 | Durbin |
| 6,135,621 A | | 10/2000 | Bach et al. |
| 6,148,075 A | | 11/2000 | Inubushi |
| 6,240,664 B1 | | 6/2001 | Hjaltason |
| 6,244,130 B1 | | 6/2001 | Shung |
| 6,347,880 B1 | | 2/2002 | Furst et al. |
| 6,389,206 B1 | | 5/2002 | Veligdan |

FOREIGN PATENT DOCUMENTS

| | | |
|---|---|---|
| WO | WO 97/09707 | 3/1997 |
| WO | WO 00/65277 | 11/2000 |
| WO | WO01/24146 | 4/2001 |
| WO | WO 01/26080 | 4/2001 |

* cited by examiner

Primary Examiner—Stephen Husar
Assistant Examiner—Anabel Ton
(74) Attorney, Agent, or Firm—Meroni & Meroni, P.C.; Charles F. Meroni, Jr.

(57) ABSTRACT

A kit for retrofittedly illuminating transmission shifter knobs. The kit comprises a retrofit knob cavity cover to replace a preexisting knob cavity cover for a knob cavity of a knob body made by a particular entity connected to a transmission shifter. The retrofit cover has a lens aperture and a switch aperture. A lens has a transparent portion disposed within the lens aperture. An illuminating mean is positioned to be disposed within the knob cavity when the knob cavity cover is replaced by the retrofit knob cavity cover. A portion of the illuminating means extends within an illuminating well illuminating the lens when activated. A switching means having a portion extending into the switch aperture activates the illuminating mean. A battery receiving structure is positioned to be disposed within the knob cavity when the knob cavity cover is replaced by the retrofit knob cavity cover.

23 Claims, 2 Drawing Sheets

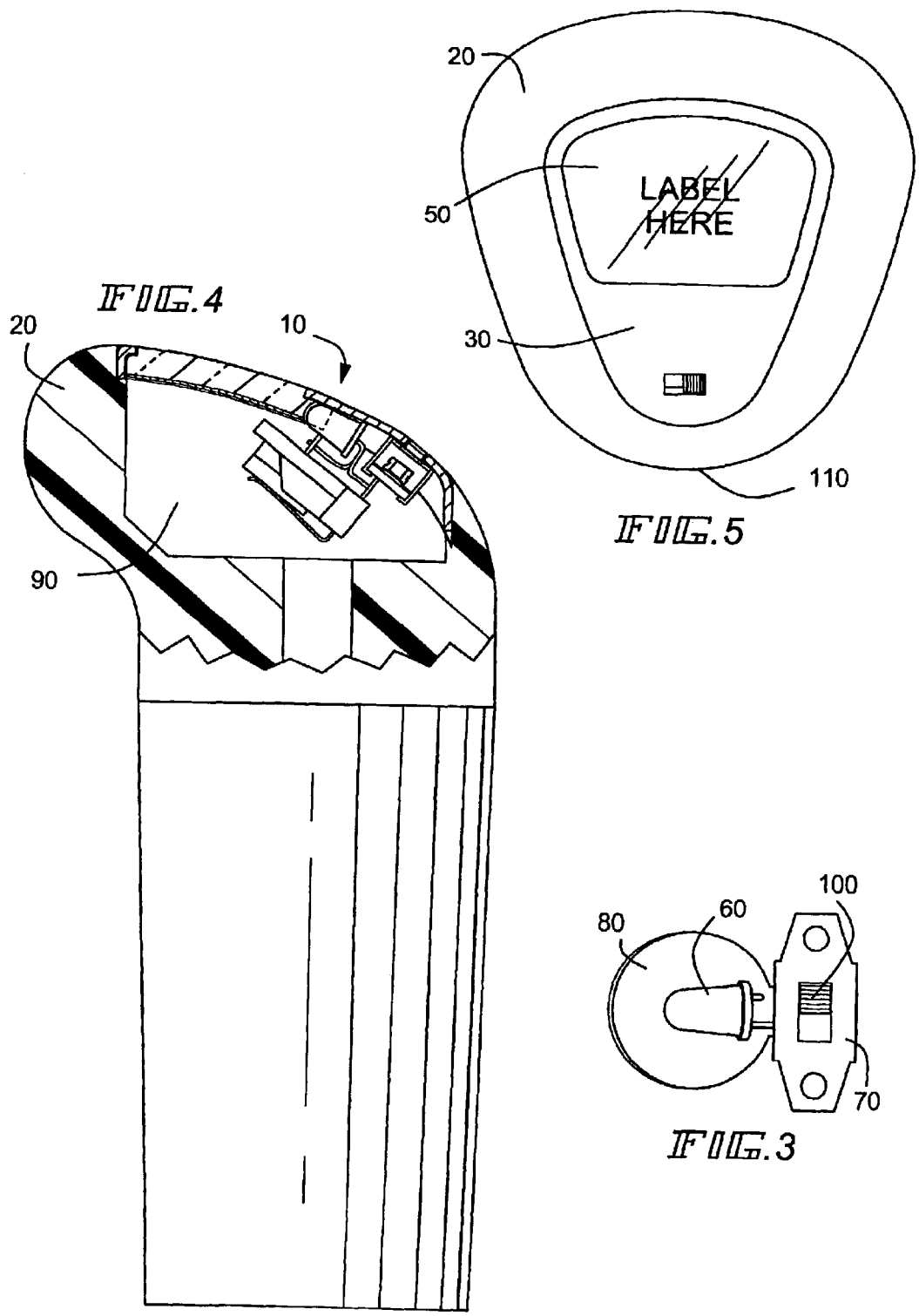

ILLUMINATED MEDALLION FOR TRANSMISSION SHIFTER KNOBS

BACKGROUND OF THE INVENTION

1. Field of the Invention

The present invention generally relates to shifting knobs for transmissions with removable medallions or cavity covers. More specifically, the present invention relates to retrofittedly illuminating medallion or cavity covers in shifting knobs for manual automotive transmissions.

2. Description of the Prior Art

Huge amounts of goods are transported at all hours of the day and night about the United States by way of tractor trailer truck. In making truck deliveries, truck drivers enter and exit tractor trailer truck cabins during night time hours and commonly face the problem of not being able to readily locate the manual transmission shifter knob in the dark due to the fact that many tractor trailer truck cabin lights are controlled such that the cabin light only illuminates the cabin when the cabin door is ajar. This is especially the case in some of the more basic tractor trailer trucks that do not provide many of the amenities that are widely available in typical passenger cars today. Therefore, a need exists in the trucking industry for a way to overcome the problem of locating the manual transmission shifter knob in the dark.

It has come to the inventor's attention that if the manual transmission shifter knob were illuminated independent of the electrical system of the tractor trailer truck, the manual transmission shifter knob would be more easily located in the dark. Although it is common in other areas of the prior art to illuminate knobs and buttons in order to facilitate location of the knobs or buttons, there still remains a need for a device that can be used to independently illuminate the manual transmission shifter knob of a tractor trailer truck. Some of the previously issued United States Patents that disclose the current state of the art are discussed here.

U.S. Pat. No. 6,347,880B1 issued to Furst, discloses a lighting device for attachment to a motor vehicle inside a housing. The lighting device uses light emitting diodes to illuminate automotive interiors and the immediate area around the exterior of an automobile. The lighting device is powered by the central electrical power supply of the automobile. This piece of prior art does not disclose or teach an independently powered lighting device that can be retrofittedly integrated into an existing automobile feature such as a manual transmission shifter knob.

U.S. Pat. No. 6,244,130 issued to Shung, discloses a gripping device equipped with a replaceable head portion which can have various artistic forms. The replaceable head portion has a centrally located attachment structure that does not teach or disclose integrating an independently powered lighting device within the replaceable head.

U.S. Pat. No. 6,003,206 issued to Hall et al., discloses a control knob utilizing a collar assembly with a housing for a light emitting diode (LED) to provide for backlighting. The control knob does not teach or disclose an independently powered lighting device that can be retrofittedly integrated into an existing structure such as a manual transmission shifter knob.

U.S. Pat. No. 3,742,204 issued to Price discloses a knob for the for a gear-selector lever of a motor vehicle that may have an electric lamp inside the knob. This piece of prior art does not disclose or teach an independently powered lighting device that can be retrofittedly integrated into an existing automobile feature such as a manual transmission shifter knob.

These previously issued United States Patents disclose using small illumination devices such as light emitting diodes to illuminate areas and make user interface structures such as knobs, buttons and levers more noticeable. However, there still remains a need for a device that can be used to retrofittedly illuminate a manual transmission shifter knob by way of an independent power source.

SUMMARY OF THE INVENTION

In order to fulfill this need, as well as others that will become readily apparent after a reading of this specification, a device that can be used to retrofittedly illuminate a manual transmission shifter knob by way of an independent power source is provided.

A primary object of the claimed invention is to provide a device that replaces an existing shifter knob cavity cover with an independently powered and operated illuminated shifter knob cavity cover that makes a manual transmission shifter knob more readily locatable in dim lighting.

Another object of the claimed invention is to provide an independently powered and operated illuminated shifter knob cavity cover that has an illuminating means for viewing of a label within the shifter knob cavity cover in dim lighting.

A further object of the claimed invention is to provide an independently powered and operated illuminated shifter knob cavity cover that may replace existing shifter knob cavity covers of several different manufacturers.

To achieve the foregoing objects and to fulfill the previously mentioned need in the trucking industry, a device for retrofittedly illuminating a manual motor transmission shifter knobs is provided. The device generally comprises a retrofit knob cavity cover or medallion, a cover cavity, a transparent lens, an illuminating means, a switching means, and a battery receiving structure.

The retrofit knob cavity cover or medallion is sized and shaped to retrofittedly replace a preexisting knob cavity cover for a knob cavity having at least one open side within a top face of a knob body made by a particular manufacturing entity connected to a manual motor transmission shifter. The retrofit knob cavity cover has a lens aperture for receiving a transparent lens portion and a switch aperture for receiving the switching means. The transparent lens portion is disposed within the lens aperture.

The lens is connected to the knob cavity cover and is sized and shaped to receive a label for viewing through the lens aperture. The lens has an illuminating well for receiving a portion of the illuminating means. A light energizable material such as phosphorus paint may be used to coat the lens to retain illumination of the lens when the illuminating means is deactivated.

The illuminating means, preferably a light emitting diode, is connected to the retrofit knob cavity cover and is positioned to be disposed within the knob cavity when the preexisting knob cavity cover is replaced by the retrofit knob cavity cover. At least a portion of the illuminating means extends within the illuminating well of the lens providing illumination of the lens when the illuminating means is activated.

The switching means is connected to the illuminating means where at least a portion of the switching means extends through the switch aperture. The switching means is preferably a two-position selector switch to selectively activate and deactivate the illuminating means.

The battery receiving structure is connected to the illuminating means and is positioned to be disposed within the knob cavity when the preexisting knob cavity cover is replaced by the retrofit knob cavity cover. The device may be packaged as a kit so that it also includes a battery disposed within the battery receiving means energizing the illuminating means when the illuminating means is activated and a label adhered to the back side of the transparent lens portion for viewing of the label when the illuminating means is activated by the switching means.

BRIEF DESCRIPTION OF THE DRAWINGS

FIG. 1 shows a top view of the retrofit knob cavity cover.

FIG. 2 shows a cross sectional view of the retrofit knob cavity cover.

FIG. 3. FIG. 3 shows a top view of the illuminating means where the illuminating means as a light emitting diode.

FIG. 4. FIG. 4 shows a side cut away view of the shifter knob.

FIG. 5. FIG. 5 shows a top view of the shifter knob

DETAILED DESCRIPTION OF THE PREFERRED EMBODIMENT

Figure 1:
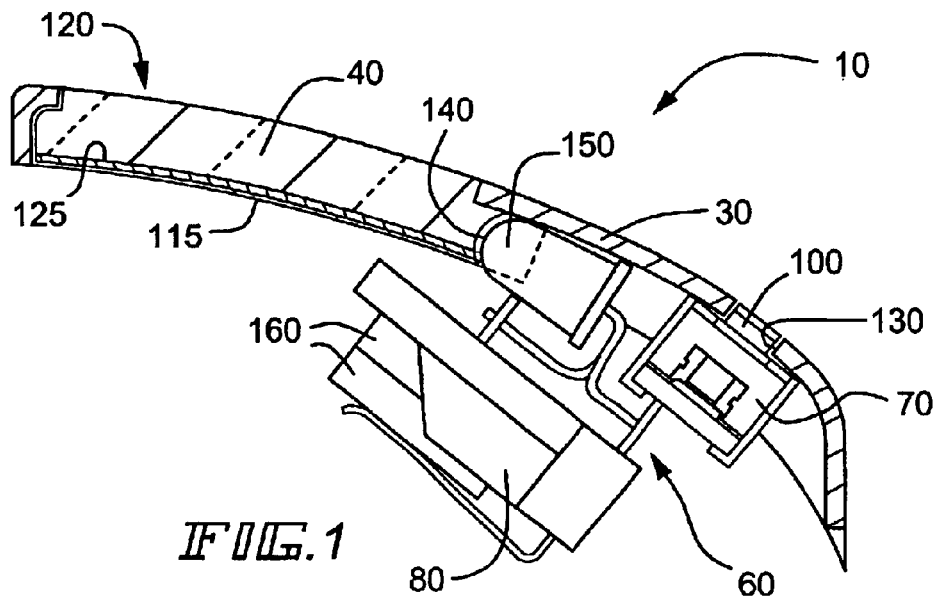
FIG. 1.
Figure 2:
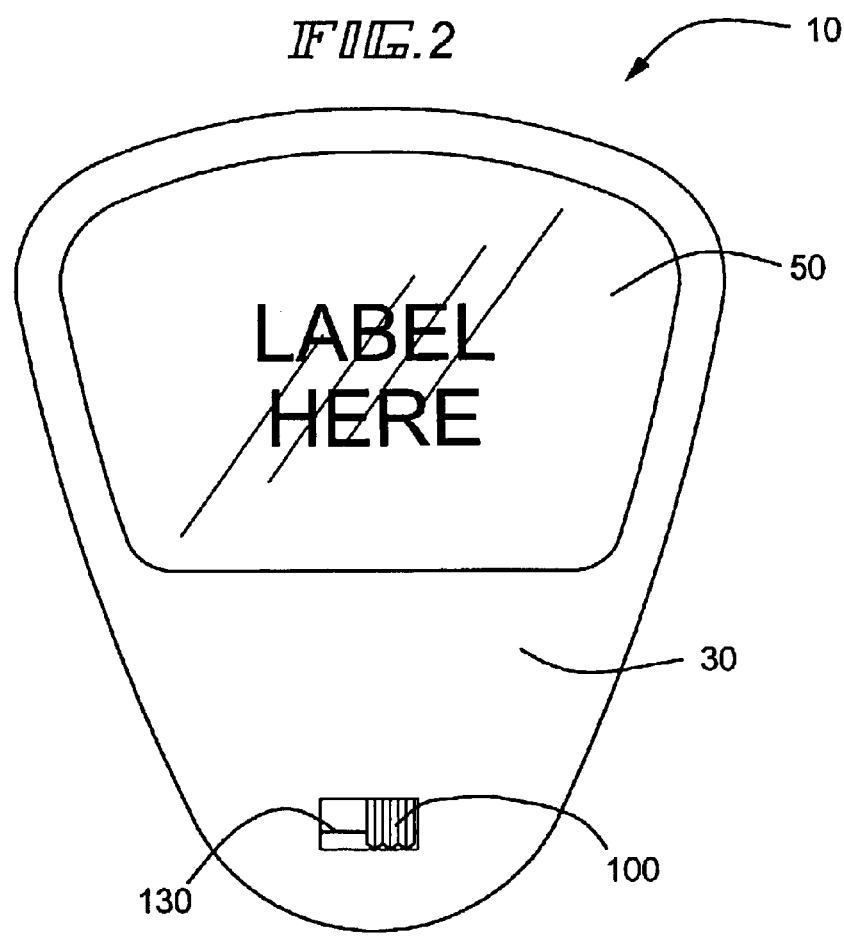
FIG. 2.

Turning now to the drawings, FIGS. 1 and 2 show the device 10 for retrofittedly illuminating a manual motor transmission shifter knob body 20. The device 10 generally comprises a retrofit knob cavity cover or medallion 30, a lens 40, a transparent portion 50, an illuminating means 60, a switching means 70, and a battery receiving structure 80. FIGS. 4 and 5 show how the retrofit knob cavity cover 30 is sized and shaped to replace a preexisting knob cavity cover generally made by the company manufacturing the shifter knob body 20.

To install the device, the preexisting knob cavity cover or medallion is removed and the device 10 is placed over the open knob cavity 90 within the top side of the shifter knob body 20. The illuminating means 60 and the switching means 70 are positioned to fit within the knob cavity 90 as show in FIG. 4. The switching means 70 and illuminating means 60 are positioned relative to the knob cavity cover 30 so that the illuminating means 60 and the battery receiving structure 80 will fit within the knob cavity 90 when the device 10 is used to replace the preexisting knob cavity cover.

FIG. 1 is a cross sectional view of the retrofit knob cavity cover or medallion 30 that shows the cover 30 has a lens 40 for receiving a label, a lens aperture 120 for receiving the transparent portion 50 of the lens 40, and a switch aperture 130 for receiving the selector switch knob 100. The knob cavity cover 30 may be made of a durable opaque plastic or metal that may handle use associated with a manual transmission shifter knob. The illuminating means 60 and the switching means 70 are connected to the bottom side of the cover 30 and are positioned so that the illuminating means 60 and the switching means 70 will fit within the knob cavity 90 of the shifter knob body 20 when the device 10 is put into use as shown in FIG. 4. FIG. 2 shows how the transparent portion 50 is disposed within the lens aperture 120 of the cover 30 so that the transparent portion 50 is flush with the lens aperture 120.

FIG. 1 shows the lens 40 is disposed within the cavity cover 30. The lens 40 is made of a transparent material such as preferably transparent plastic or glass. A light energizable material such as phosphorous paint 115 may be used to coat the lens 40 to reflect illumination from the illuminating means 60 toward a transparent portion 50 of the lens 40 that is disposed within the lens aperture 120 so that a label 125 adhered to the back of the lens 40 may be viewed through the lens aperture 120. The phosphorous paint 115 covers the back side of the label 125 and acts to prolong the illumination of the shifter knob after the illuminating means 60 has been deactivated by the switching means 70 and provides an aesthetically desirable appearance in dim lighting. The curvature of the inner walls of the cavity cover 30 and lens 40 deflect light from the illuminating means 60 toward the transparent portion 50 of the lens 40 increasing the amount of illumination radiating through the lens aperture 120 to increase the viewability of the label 125. An illuminating well 140 for receiving a portion of the illuminating means 60 is positioned within a side wall of the lens so that the illuminating means 60 will illuminate the lens 40. The phosphorous paint 115 does not cover the illuminating well 140 of the lens 40 so that illumination for the illuminating means 60 will illuminate the lens 40 and show through the transparent portion 50 of the lens 40.

The illuminating means 60 is connected to the bottom side of the retrofit knob cavity cover 30 and is positioned to be disposed within the knob cavity 90 when the preexisting knob cavity cover is replaced by the device 10. The illuminating means 60 is preferably a battery operated light emitting diode (LED) where at least a portion 150 of the LED extends within the illuminating well 140 providing illumination of the lens 40 when the LED is activated by the switching means 70.

The switching means 70 is preferably a two-position selector switch that is connected in circuit to the LED 60 to selectively activate and deactivate the LED 60, but may be some other type such as a push button switch. The selector switch 70 is connected to the bottom side of the cover 30 such that the selector switch 100 extends into the switch aperture 130 of the cover 30. The selector switch knob 100 is preferably flush with the top face of the cover 30 so that the selector switch will not interfere with comfortable gripping of the knob body 20 and to prevent accidental activation of the LED 60.

The battery receiving structure 80 is connected to the illuminating means 60 and is positioned to be disposed within the knob cavity 90 when the preexisting knob cavity cover is replaced by the device 10 as shown in FIG. 4. A single battery or a plurality of batteries 160 may also be included with the device 10 to form a kit for retrofittedly illuminating the knob of a manual transmission shifter. The battery 160 can be inserted within the battery receiving structure 80 to energize the LED 60 when the LED 60 is activated by the selector switch 70.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A manual motor transmission shifter knob having an independently powered and operated illuminating light, the shifter knob comprising:

a manual motor transmission shifter knob body having a top face;

a knob cavity having at least one open side within the top face of the knob body;

a knob cavity cover having a top face sized and shaped to cover the open side of the knob cavity, the knob cavity cover having a lens aperture for receiving a lens and a switch aperture for receiving a switching means;

a lens connected to the knob cavity cover having a transparent portion disposed within the lens aperture and an illuminating well;

an illuminating means disposed within the knob cavity connected to the knob cavity cover having at least a portion of the illuminating means extending within the illuminating well providing illumination of the lens when the illuminating means is activated;

a switching means for activating the illuminating means connected to the illuminating means, at least a portion of the switching means extending into the switch aperture;

a battery receiving structure disposed within the knob cavity connected to the illuminating means.

2. The shifter knob of claim 1 further comprising a label connected to the lens axially aligned with the transparent portion of the lens.

3. The shifter knob of claim 2 further comprising a light energizable material connected to the lens, the light energizable material energized by the illuminating means when the illuminating means is activated.

4. The shifter knob of claim 3 further comprising at least one battery disposed within the battery receiving means energizing the illuminating means when the illuminating means is activated.

5. The shifter knob of claim 4 wherein the illuminating means is a light emitting diode.

6. The shifter knob of claim 5 wherein the switching means is a two-position selector switch.

7. The shifter knob of claim 5 wherein the switching means is a pushbutton.

8. A kit for retrofittedly illuminating manual motor transmission shifter knobs, the kit comprising:

a retrofit knob cavity cover sized and shaped to retrofittedly replace a preexisting knob cavity cover for a knob cavity having at least one open side within a top face of a preexisting knob body connected to a manual motor transmission shifter, the retrofit knob cavity cover having a lens aperture for receiving a lens and a switch aperture for receiving a switching means;

a lens connected to the knob cavity cover having a transparent portion disposed within the lens aperture and an illuminating well;

an illuminating means connected to the retrofit knob cavity cover positioned to be disposed within the knob cavity when the preexisting knob cavity cover is replaced by the retrofit knob cavity cover, at least a portion of the illuminating means extending within the illuminating well providing illumination of the cover cavity when the illuminating means is activated;

a switching means for activating the illuminating means connected to the illuminating means, at least a portion of the switching means extending into the switch aperture;

a battery receiving structure connected to the illuminating means positioned to be disposed within the knob cavity when the preexisting knob cavity cover is replaced by the retrofit knob cavity cover.

9. The kit of claim 8 further comprising a label connected to the lens axially aligned with the transparent portion of the lens.

10. The kit of claim 9 further comprising a light energizable material connected to the lens, the light energizable material energized by the illuminating means when the illuminating means is activated.

11. The kit of claim 10 further comprising a battery disposed within the battery receiving means energizing the illuminating means when the illuminating means is activated.

12. The kit of claim 11 wherein the illuminating means is a light emitting diode.

13. The kit of claim 12 wherein the switching means is a two-position selector switch.

14. The kit of claim 12 wherein the switching means is push button.

15. In a manual motor transmission shifter knob body having a knob cavity cover covering a knob cavity having at least one open side within the top face of the shifter knob body the improvement comprising illuminating a transparent lens within a lens aperture of the knob cavity cover with an independently battery powered illuminating means connected to the knob cavity cover and disposed within the knob cavity, the illuminating means switchably activated by a switching means having a switching portion extending into a switch aperture of the knob cavity cover.

16. The improvement of claim 15 further comprising a label connected to the lens axially aligned with the lens aperture of the knob cavity cover.

17. The improvement of claim 16 further comprising a light energizable material connected to the lens, the light energizable material energized by the illuminating means when the illuminating means is activated.

18. The improvement of claim 17 wherein the illuminating means is a light emitting diode.

19. The improvement of claim 18 wherein the switching means is a two-position selector switch.

20. The improvement of claim 18 wherein the switching means is a push button.

21. A self contained illuminating knob cavity cover for manual motor transmission shifter knobs having an open cavity within the top surface of the shifter knob body, the cover comprising:

a knob cavity cover sized and shaped to cover a cavity having an open side within a top face of a non-illuminating manual motor transmission shifter knob body with a lens aperture for receiving a lens and a switch aperture for receiving a switching means;

a lens attached to the knob cavity cover positioned to be visible from the top face of the shifter knob body having a transparent portion disposed within the lens aperture and an illuminating well;

a light emitting diode attached to the knob cavity cover having at least a portion of the light emitting diode extending within the illuminating well providing illumination of the lens when the light emitting diode is activated;

a light energizable paint adhered to the lens energized by the light emitting diode when the light emitting diode is activated, the light energizable paint illuminating the lens after deactivation of the light emitting diode;

switching means connected to the light emitting diode and attached to the knob cavity cover for activating the light emitting diode, at least a portion of the switching means extending into the switch aperture; and a battery receiving structure connected to the light emitting diode disposed within the knob cavity when the manual motor transmission shifter knob body is used as a manual motor transmission shifter knob.

22. The cover of claim 21 further comprising a label connected to the lens and axially aligned with the lens aperture of the knob cavity cover, the light emitting diode illuminating the label.

23. The cover of claim 22 wherein the switching means is a two-position selector switch accessible through the open side of the cavity.

* * * * *